United States Patent
Takeichi et al.

(10) Patent No.: US 6,549,188 B1
(45) Date of Patent: Apr. 15, 2003

(54) FERROELECTRIC LIQUID-CRYSTAL DISPLAY WITH WIDE RANGE OF WORKING TEMPERATURES

(75) Inventors: Ayako Takeichi, Tokorozawa (JP); Barbara Hornung, Hasselroth (DE); Hans-Rolf Dübal, Eltville (DE)

(73) Assignee: Aventis Research & Technology Deutschland GmbH & Co.KG, Frankfurt am Main (DE)

( * ) Notice: Subject to any disclaimer, the term of this patent is extended or adjusted under 35 U.S.C. 154(b) by 0 days.

(21) Appl. No.: 09/462,858

(22) PCT Filed: Jul. 13, 1998

(86) PCT No.: PCT/EP98/04335

§ 371 (c)(1),
(2), (4) Date: Jun. 15, 2000

(87) PCT Pub. No.: WO99/04383

PCT Pub. Date: Jan. 28, 1999

(30) Foreign Application Priority Data

Jul. 18, 1997 (DE) .......................................... 197 31 020

(51) Int. Cl.[7] .................................................. G09G 3/36
(52) U.S. Cl. ..................................... 345/97; 252/299.01
(58) Field of Search ..................... 345/97, 94; 349/191, 349/35; 252/299.01; 427/558

(56) References Cited

U.S. PATENT DOCUMENTS

| | | | | |
|---|---|---|---|---|
| 4,701,026 A | * | 10/1987 | Yazaki et al. ................ | 345/208 |
| 4,915,477 A | | 4/1990 | Ohta et al. .................... | 345/94 |
| 5,013,137 A | | 5/1991 | Tsuboyama et al. ......... | 349/191 |
| 5,322,639 A | * | 6/1994 | Kawabata et al. ..... | 252/299.01 |
| 5,889,566 A | * | 3/1999 | Wu et al. ...................... | 345/98 |
| 5,938,972 A | * | 8/1999 | Yasuda et al. .......... | 252/299.01 |
| 6,016,906 A | * | 1/2000 | Kruse et al. ................ | 206/526 |
| 6,154,190 A | * | 11/2000 | Yang et al. ................... | 345/94 |

FOREIGN PATENT DOCUMENTS

| | | |
|---|---|---|
| DE | 36 30012 A | 4/1987 |
| DE | 38 34791 A | 4/1989 |
| EP | 0032362 | 7/1981 |
| EP | 0283916 | 9/1988 |
| EP | 0370649 | 5/1990 |
| FR | 95 02651 | 9/1996 |

OTHER PUBLICATIONS

Liquid Crystals, 1998, vol. 24, No. 4, pp. 599–605, entitled "New Series of Ferroelectric Liquid Crystals with Four Ester Groups" by Hamplova et al.

* cited by examiner

Primary Examiner—Steven Saras
Assistant Examiner—Uchendu O. Anyaso
(74) Attorney, Agent, or Firm—Frommer Lawrence & Haug LLP

(57) ABSTRACT

Ferroelectric liquid-crystal display having a broad operating temperature range. A ferroelectric liquid-crystal display containing a ferroelectric liquid-crystal mixture which is addressed with voltage pulses $\geq 0.9$ ms. The display according to the invention is particularly suitable for applications in which the length of the response time is not critical. Such displays can be operated with the same voltage over a broad temperature range; adjustment of the voltage as a function of temperature is not necessary. Examples of preferred applications are displays in chip cards, electronic price and display signs (shelf labels), PDAs (personal digital assistants) and pagers.

9 Claims, No Drawings

FERROELECTRIC LIQUID-CRYSTAL DISPLAY WITH WIDE RANGE OF WORKING TEMPERATURES

SEQUENCE LISTING

Not Applicable.

CROSS-REFERENCE TO RELATED APPLICATIONS

Not Applicable.

STATEMENT REGARDING FEDERALLY SPONSORED RESEARCH OR DEVELOPMENT

Not Applicable.

INCORPORATION BY REFERENCE OF MATERIAL SUBMITTED ON A COMPACT DISC

Not Applicable.

BACKGROUND OF THE INVENTION (1) Field of the Invention

Ferroelectric liquid-crystal display having a broad operating temperature range.

(2) Description of Related Art

Owing to their unusual combination of anisotropic and fluid behavior, liquid crystals have found a multiplicity of possible applications in electro-optical switching and display devices.

Besides nematic liquid-crystal phases, which have been employed for some time, recent years have also seen the use of smectic liquid-crystal phases, in particular ferroelectric liquid-crystal phases (FLCs).

The practical use of ferroelectric liquid crystals in electro-optical switching and display elements requires chiral, tilted smectic phases, such as $S_C^*$ phases (see, for example, R. B. Meyer, L. Liebert, L. Strzelecki and P. Keiler, J. Physique 36 L-69 (1975)), which are stable over a broad temperature range.

Switching and display devices containing ferroelectric liquid-crystal mixtures ('FLC light valves') are disclosed, for example, in EP-B 0 032 362. LC light valves are devices which, for example owing to electrical switching, modify their optical transmission or reflection properties in such a way that transmitted or reflected light is modulated in intensity. Examples are the known watch and calculator displays or LC displays in the area of office communications and television.

BRIEF SUMMARY OF THE INVENTION

The response time t of a ferroelectric liquid crystal or of the mixture in the display is inversely proportional to the spontaneous polarization $P_s$:

$$t \sim \gamma/P_s$$

$\gamma$=viscosity
(see, inter alia, J. W. Goodby et al., "Ferroelectric Liquid Crystals, Principles, Properties and Applications", Ferroelectricity and Related Phenomena, Vol. 7, 1991, Gordon and Breach Science Publishers).

From EP-A-O 370 649 an addressing scheme for FLC matrixes is known in which bipolar pulses are employed in a manner that single pixels of the matrix may be switched in different dates using a reduced number of pulses. The application contains a diagram in which the relation between the operating voltage of the display and the pulse width necessary for switching the liquid crystal mixture is shown with different values for the spontaneous polarization Ps.

From EP-A-O 283 916 a FLC-device is known in which the phase sequence of the FLC-mixture a smectic A-phase is following a $S_C^*$-phase and in which either the elastic constant is according to a specific formula or the spontaneous polarization is higher than a specific value. For the experimental use the device is operated with pulses of 30V and 2 ms length.

From DE-A-36 30 012 a FLC-device is known in which the angles between the average directions of the molecular axes obey specific relations.

FR-A-2 731 537 discloses a chip-card containing a FLC-display.

The viscosity is temperature dependent as follows:

$$\gamma(T) \sim \exp V/k_b T$$

V=activation energy $k_b$=Boltzmann constant

T=temperature

This means that the response time t is highly dependent on the temperature (see, for example, E. P. Pozhidayev et al., Mol. Cryst. Liq. Cryst., 1985, Vol. 124, pp. 359–377).

In the case of fluctuating temperatures, therefore, either the operating voltage, for a constant response time, or the response time, for a constant operating voltage, must be constantly adjusted.

The quotient Q of the threshold voltage at 0° C. and at 40° C. may be regarded as a measure of the temperature dependence:

$$Q = V(0°\ C.)/V(40°\ C.)$$

In the FLC displays developed hitherto, this quotient is of an order of magnitude which makes voltage adjustment necessary in practice (see, for example, the "Merck Liquid Crystals, Licristal®, Ferroelectric Smectic Mixtures, June 1991" catalog from Merck, Darmstadt, Germany).

Surprisingly, it has now been found that, however, at long response times, generally of greater than or equal to t=1 ms, and relatively high values for the spontaneous polarization $P_s$, generally of greater than 5 nCcm$^{-2}$, the temperature dependence of the threshold voltage, and thus the value Q, becomes small.

The invention therefore relates to a ferroelectric liquid-crystal display containing a ferroelectric liquid-crystal mixture, wherein the display is addressed with voltage pulses of longer than 0.9 ms.

The invention likewise relates to a display as described above having improved temperature dependence of the operating voltage.

BRIEF DESCRIPTION OF THE SEVERAL VIEWS OF THE DRAWING(S)

Not Applicable.

DETAILED DESCRIPTION OF THE INVENTION

The invention furthermore relates to a process for the production of a ferroelectric liquid-crystal display having improved temperature dependence of the operating voltage, which comprises matching the ferroelectric liquid-crystal mixture and the electrical addressing to one another in such a way that the product of the spontaneous polarization (in nanocoulombs/square centimeter) and the width of the voltage pulses used for addressing (in milliseconds) is greater than 15 preferably 20, particularly preferably 100, in particular 500.

The invention likewise relates to a process for improving the temperature dependence of the operating voltage of an FLC display, wherein the display is addressed with voltage pulses which are longer than 0.9 ms.

The display according to the invention is particularly suitable for applications in which very fast switching is unnecessary. Such displays can be switched with the same voltage over a very broad temperature range; adjustment of the voltage as a function of the temperature is unnecessary.

In addition, the requisite operating voltages are very low and can be less than 15 V, in some cases less than 5 V, in particular even less than 3 V.

Preferred applications are therefore, for example, displays in chip cards, electronic price and display signs (shelf labels), PDAs (personal digital assistants) or pagers.

The display according to the invention is constructed in such a way that an FLC layer is enclosed on both sides by layers, which are usually, in this sequence, starting from the FLC layer, at least one alignment layer, electrodes and an outer plate (for example made of glass or plastic). In addition, they contain least one polarizer if they are operated in 'guest-host' or reflective mode, or two polarizers if the mode used is transmissive birefringence. The switching and display elements can, if desired, contain further auxiliary layers, such as diffusion barrier or insulation layers.

The alignment layer(s) are usually rubbed films of organic polymers or silicon oxide vapor-deposited at an angle.

In order to achieve a uniform planar alignment in the $S_C^*$ phase over the entire display, it is advantageous if the phase sequence of the liquid-crystal mixture is, with decreasing temperature:

isotropic–nematic–smectic A–smectic C (see, for example, K. Flatischler et al., Mol. Cryst. Liq. Cryst. 131 21 (1985); T. Matsumoto et al., pp. 468–470, Proc. of the 6th Int. Display Research Conf., Japan Display, Sep. 30–Oct. 2, 1986, Tokyo, Japan; M. Murakami et al., ibid. pp. 344–347).

In order to achieve the highest possible contrast in the display, the planar alignment in the display should be uniform. This is achieved if the pitch of the helix in the $S_C^*$ phase of the liquid crystal or of the liquid-crystal mixture is sufficiently high to prevent formation of a helix in the display. Furthermore, the helix in the N* phase should be sufficiently large that no twisted state, but instead a homogeneous nematic phase, forms in the display during the cooling process.

Switching the molecules back and forth (and thus the light or dark position in the case of a fixed polarizer setting) is carried out, as already mentioned, by applying an electric field in a pulsed manner. Because of the bistability of the FLC molecules, voltage need only be applied for a change in alignment. A subdivision of the display into individual pixels is achieved by the known matrix arrangement of the electrodes. A comprehensive description of multiplex addressing for FLC displays is given, for example in Proc. SID 28/2, 211 (1978) and Ferroelectrics 94, 3 (1989).

The display according to the invention is generally addressed directly or as multiplex addressing (see, for example, Jean Dijon in Liquid Crystals, Application and Uses (Ed. B Bahadur), Vol. 1, 1990, Chapter 13, pp. 305–360) or T. Harada, M. Taguchi, K. Iwasa, M. Kai, SID 85 Digest, page 131 (1985), in which case only the response times are chosen to be sufficiently long.

The display is preferably addressed with voltage pulses in the range from 0.9 ms to 2 s, particularly preferably from 1.0 ms to 500 ms, in particular from 10 to 300 ms.

Preference is given to displays in which the product of the spontaneous polarization $P_s$ (nCcm$^{-2}$) of the FLC mixture (at 25° C.) and the length of the addressing pulses (operating pulse width) t (ms) is greater than 15 nCms cm$^{-2}$, preferably 20 nCms cm$^{-2}$, particularly preferably 100 nCms cm$^{-2}$, in particular 500 nCms cm$^{-2}$.

It is preferred here that the spontaneous polarization $P_s$ is at least 20 nC cm$^{-2}$ (at 25° C.) and the operating pulse width t is $\geq 2.5$ ms.

Preference is furthermore given to displays whose FLC mixture has an $S_A/S_C$ phase transition temperature of $\geq 70°$ C.

Suitable components for ferroelectric liquid-crystal mixtures are known to the person skilled in the art.

The liquid crystal generally comprises at least 2 components, preferably from 5 to 30 components, particularly preferably from 8 to 25 components.

The mixture is prepared by methods known per se.

The components of the mixture are preferably selected from known compounds having smectic and/or nematic and/or cholesteric phases, for example of the formula (I)

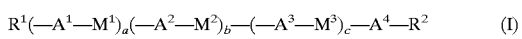

where the symbols and indices are defined as follows:

$R^1$ and $R^2$ are identical or different and are
  a) hydrogen, —F, —Cl, —CF$_3$, —OCF$_3$ or —CN, with the proviso that at most one of the radicals $R^1$ and $R^2$ can be hydrogen, —F, —Cl, —CF$_3$, —OCF$_3$ or —CN,
  b) a straight-chain or branched alkyl radical (with or without an asymmetrical carbon atom) having 1 to 20 carbon atoms, where
    b1) one or more non-adjacent and non-terminal —CH$_2$— groups may be replaced by —O—, —S—, —CO—, —CO—O—, —O—CO—, —O—CO—O— or —Si(CH$_3$)$_2$—, and/or
    b2) one or more —CH$_2$— groups may be replaced by —CH=CH—, —C≡C—, cyclopropane-1,2-diyl, 1,4-phenylene, 1,4-cyclohexylene or 1,3-cyclopentylene, and/or
    b3) one or more H atoms may be replaced by F, CN and/or Cl, and/or
    b4) the terminal —CH$_3$ group may be replaced by one of the following chiral groups (optically active or racemic):

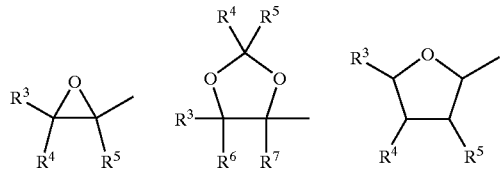

-continued

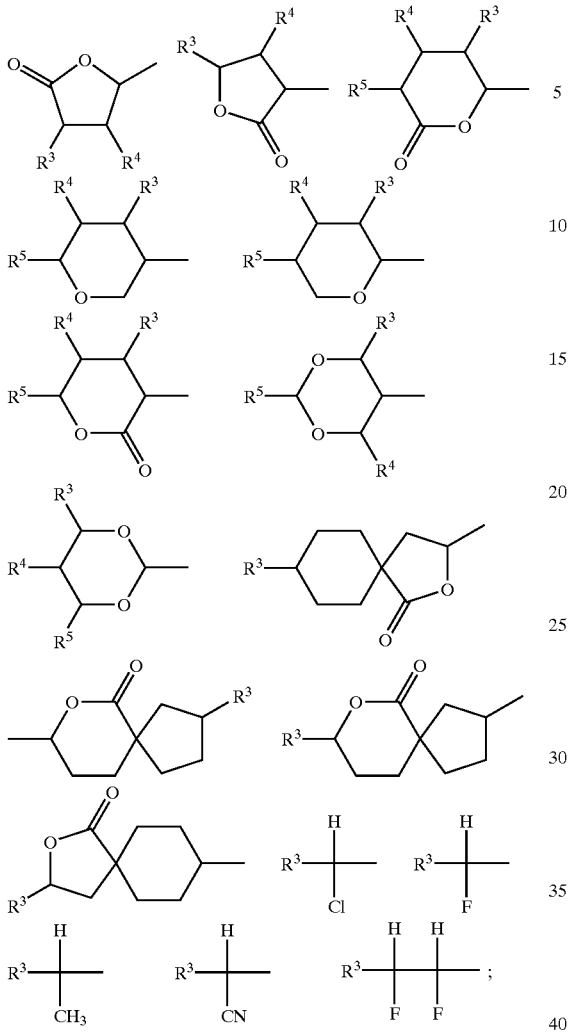

R³, R⁴, R⁵, R⁶ and R⁷ are identical or different and are
a) hydrogen
b) a straight-chain or branched alkyl radical (with or without an asymmetrical carbon atom) having 1 to 16 carbon atoms, where
b1) one or more non-adjacent and non-terminal —CH₂— groups may be replaced by —O—, and/or
b2) one or two —CH₂— groups may be replaced by —CH=CH—,
c) R⁴ and R⁵ together may alternatively be —(CH₂)₄— or —(CH₂)₅— if they are bonded to an oxirane, dioxolane, tetrahydrofuran, tetrahydropyran, butyrolactone or valerolactone system;

M¹, M² and M³ are identical or different and are
—CO—O—, —O—CO—, —CO—S—, —S—CO—, —CS—O—, —O—CS—, —CS—S—, —S—CS—, —CH₂—O—, —O—CH₂—, —CH₂—S—, —S—CH₂—, —CH₂—CH₂—, —CH=CH—, —C≡C—, —CH₂—CH₂—CO—O—, —O—CO—CH₂—CH₂—, —CH=N— or a single bond;

A¹, A², A³ and A⁴ are identical or different and are
1,4-phenylene, in which one or more H atoms may be replaced by F, Cl, CH₃, C₂H₅, OCH₃, CF₃, OCF₃ and/or CN, 1,3-phenylene, in which one or two CH groups may be replaced by N, pyrazine-2,5-diyl, in which one or two H atoms may be replaced by F, Cl and/or CN, pyridazine-3,6-diyl, in which one or two H atoms may be replaced by F, Cl and/or CN, pyridine-2,5-diyl, in which one or more H atoms may be replaced by F, Cl and/or CN, pyrimidine-2,5-diyl, in which one or two H atoms may be replaced by F, Cl and/or CN, 1,4-cyclohexylene, in which one or two H atoms may be replaced by CN and/or CH₃ and/or F, 1,3,4-thiadiazole-2,5-diyl, 1,3-dioxane-2,5-diyl, 1,3-dithiane-2,5-diyl, 1,3-thiazole-2,4-diyl, in which one H atom may be replaced by F, Cl and/or CN, 1,3-thiazole-2,5-diyl, in which one H atom may be replaced by F, Cl and/or CN, thiophene-2,4-diyl, in which one H atom may be replaced by F, Cl and/or CN, thiophene-2,5-diyl, in which one or two H atoms may be replaced by F, Cl and/or CN, naphthalene-2,6-diyl, naphthalene-1,4-diyl or naphthalene-1,5-diyl, in each of which one or more H atoms may be replaced by F, Cl and/or CN and/or one or two CH groups may be replaced by N, phenanthrene-2,7-diyl or 9,10-dihydrophenanthrene-2,7-diyl, in each of which one, two or more H atoms may be replaced by F and/or one or two CH groups may be replaced by N, indane-2,5-diyl, indan-1-one-2,5-diyl, benzothiazole-2,6-diyl, benzothiazole-2,5-diyl, benzoxazole-2,6-diyl, benzoxazole-2,5-diyl, benzofuran-2,5-diyl, benzofuran-2,6-diyl, 2,3-dihydrobenzofuran-2,5-diyl, piperazine-1,4-diyl, piperazine-2,5-diyl or 1,3-dioxaborinane-2,5-diyl;

a, b and c are zero or one, with the proviso that the compound of the formula (I) cannot contain more than four five- or multimembered ring systems.

The symbols and indices in the formula (I) are preferably defined as follows:

R¹ and R² are identical or different and are
a) hydrogen, —F, —OCF₃ or —CN, with the proviso that at most one of the radicals R¹ and R² can be hydrogen, —F, —OCF₃ or —CN,
b) a straight-chain or branched alkyl radical (with or without an asymmetrical carbon atom) having 1 to 18 carbon atoms, where
b1) one or more non-adjacent and non-terminal —CH₂— groups may be replaced by —O—, —CO—O—, —O—CO—, —O—CO—O— or —Si(CH₃)₂—, and/or
b2) one —CH₂— group may be replaced by cyclopropane-1,2-diyl, 1,4-phenylene or trans-1,4-cyclohexylene, and/or
b3) one or more H atoms may be replaced by F, and/or
b4) the terminal —CH₃ group may be replaced by one of the following chiral groups (optically active or racemic):

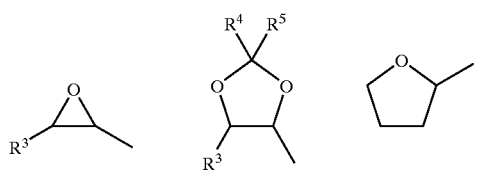

-continued

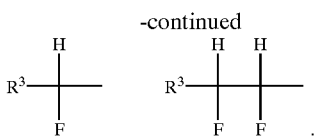

$R^1$ and $R^2$ are particularly preferably identical or different and are particularly preferably
a) hydrogen,
b) a straight-chain or branched alkyl radical (with or without an asymmetrical carbon atom) having 1 to 16 carbon atoms, where
b1) one or two non-adjacent and non-terminal —$CH_2$— groups may be replaced by —O—, —CO—O—, —O—CO—, —O—CO—O— or —Si(CH$_3$)$_2$—, and/or
b2) one —$CH_2$— group may be replaced by 1,4-phenylene or trans-1,4-cyclohexylene, and/or
b3) one or more H atoms may be replaced by F, and/or
b4) the terminal —$CH_3$ group may be replaced by one of the following chiral groups (optically active or racemic):

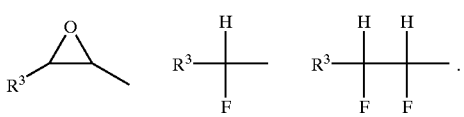

$R^3$, $R^4$, $R^5$, $R^6$ and $R^7$ are identical or different and are
a) hydrogen
b) a straight-chain or branched alkyl radical (with or without an asymmetrical carbon atom) having 1 to 14 carbon atoms, where
b1) one or two non-adjacent and non-terminal —$CH_2$— groups may be replaced by —O—, and/or
b2) one —$CH_2$— group may be replaced by —CH═CH—,
c) $R^4$ and $R^5$ together may alternatively be —(CH$_2$)$_4$— or —(CH$_2$)$_5$— if they are bonded to an oxirane, dioxolane, tetrahydrofuran, tetrahydropyran, butyrolactone or valerolactone system.

$R^3$, $R^4$, $R^5$, $R^6$ and $R^7$ are particularly preferably identical or different and are
a) hydrogen
b) a straight-chain or branched alkyl radical (with or without an asymmetrical carbon atom) having 1 to 14 carbon atoms, where
b1) one non-terminal —$CH_2$— group may be replaced by —O—,
c) $R^4$ and $R^5$ together may alternatively be —(CH$_2$)$_4$— or —(CH$_2$)$_5$— if they are bonded to an oxirane, dioxolane, tetrahydrofuran, tetrahydropyran, butyrolactone or valerolactone system.

$M^1$, $M^2$ and $M^3$ are preferably identical or different and are
—CO—O—, —O—CO—, —CH$_2$—O—, —O—CH$_2$—, —CH═CH—, —C≡C—, —CH$_2$—CH$_2$—CO—O—, —O—CO—CH$_2$—CH$_2$— or a single bond.

$M^1$, $M^2$ and $M^3$ are particularly preferably identical or different and are particularly preferably
—CO—O—, —O—CO—, —CH$_2$—O—, —O—CH$_2$— or a single bond.

$A^1$, $A^2$, $A^3$ and $A^4$ are preferably identical or different and are preferably
1,4-phenylene, in which one or two H atoms may be replaced by F, Cl, CH$_3$ and/or CN, 1,3-phenylene, pyridine-2,5-diyl, in which one or two H atoms may be replaced by F and/or CN, pyrimidine-2,5-diyl, in which one or two H atoms may be replaced by F and/or CN, trans-1,4-cyclohexylene, in which one or two H atoms may be replaced by CN and/or F, 1,3,4-thiadiazole-2,5-diyl, 1,3-dioxane-2,5-diyl, 1,3-thiazole-2,4-diyl, in which one H atom may be replaced by F, 1,3-thiazole-2,5-diyl, in which one H atom may be replaced by F, thiophene-2,5-diyl, in which one or two H atoms may be replaced by F, naphthalene-2,6-diyl, in which one or two H atoms may be replaced by F and/or CN and/or one or two CH groups may be replaced by N, phenanthrene-2,7-diyl or 9,10-dihydrophenanthrene-2,7-diyl, in each of which one, two or more H atoms may be replaced by F and/or one or two CH groups may be replaced by N, indane-2,5-diyl, benzothiazole-2,6-diyl or benzothiazole-2,5-diyl.

$A^1$, $A^2$, $A^3$ and $A^4$ are particularly preferably identical or different and are particularly preferably
1,4-phenylene, in which one or two H atoms may be replaced by F, Cl and/or CN, 1,3-phenylene, pyridine-2,5-diyl, in which one H atom may be replaced by F, pyrimidine-2,5-diyl, trans-1,4-cyclohexylene, in which one or two H atoms may be replaced by CN and/or F, 1,3,4-thiadiazole-2,5-diyl, 1,3-thiazole-2,5-diyl, thiophene-2,5-diyl, naphthalene-2,6-diyl, in which one or two CH groups may be replaced by N, phenanthrene-2,7-diyl or 9,10-dihydrophenanthrene-2,7-diyl, in each of which one or two H atoms may be replaced by F and/or one or two CH groups may be replaced by N, or indane-2,5-diyl.

The mixture generally comprises at least 2 components, preferably from 3 to 30 components, particularly preferably from 4 to 20 components of the formula (I).

These include, for example:

derivatives of phenylpyrimidine, as described, for example, in WO 86/06401 and U.S. Pat. No. 4,874,542, meta-substituted six-membered-ring aromatic compounds, as described, for example, in EP-A 0 578 054, silicon compounds, as described, for example, in EP-A 0 355 008, mesogenic compounds having only one side chain, as described, for example, in EP-A 0 541 081, hydroquinonone derivatives, as described, for example, in EP-A 0 603 786, phenylbenzoates and biphenylbenzoates, as described, for example, in P. Keller, Ferroelectrics 1984, 58, 3; Liq. Cryst. 1987, 2, 63; Liq. Cryst. 1989, 5, 153; and J. W. Goodby et al., Liquid Crystals and Ordered Fluids, Vol. 4, New York, 1984, thiadiazoles, as described, for example, in EP-A 0 309 514, biphenyls, as described, for example, in EP-A 0 207 712 or Adv. Liq. Cryst. Res. Appl. (Ed. Bata, L.) 3 (1980), phenylpyridines, as described, for example, in Ferroelectrics 1996, 180, 269, or Liq. Cryst. 1993, 14, 1169, benzanilides, as described, for example, in Liq. Cryst. 1987, 2, 757, or Ferroelectrics 1984, 58, 81, terphenyls, as described, for example, in Mol. Cryst. Liq. Cryst. 1991, 195, 221; WO 89/02425 or Ferroelectrics 1991, 114, 207, 4-cyanocyclohexyls, as described, for example, in Freiburg Congress on Liquid Crystals 1986, 16, V8, 5-alkylthiophenecarboxylic esters, as described, for example, in Butcher, J. L., disseration, Nottingham 1991, and 1,2-diphenylethanes, as described, for example, in Liq. Cryst. 1991, 9, 253.

Examples of suitable chiral, non-racemic dopants are the following:

optically active phenylbenzoates, as described, for example, in P. Keller, Ferroelectrics 1984, 58, 3, and J. W. Goodby et al., Liquid Crystals and Ordered Fluids, Vol. 4, New York, 1984, optically active oxirane ethers, as described, for example, in EP-A 0 263 437 and WO-A 93/13093, optically active oxirane esters, as described, for example, in EP-A 0 292 954, optically active dioxolane ethers, as described, for example, in EP-A 0 351 746, optically active dioxolane esters, as described, for example, in EP-A 0 361 272, optically active tetrahydrofuran-2-carboxylic esters, as described, for example, in EP-A 0 355 561, optically active 2-fluoroalkyl ethers, as described, for example, in EP-A 0 237 007 and U.S. Pat. No. 5,051, 506, and optically active α-halocarboxylic esters, as described, for example, in U.S. Pat. No. 4,855,429.

Particularly preferred mixture components of the liquid crystal are those in Groups A to M:

A. Phenylpyrimidine Derivatives of the Formula (II)

$$R^1—A^1—A^2—R^2 \quad (II)$$

in which $R^1$ and $R^2$ are each alkyl having 1–15 carbon atoms, in which, in addition, one or two non-adjacent —CH$_2$— groups may be replaced by —O—, —S—, —CO—, —O—CO—, —CO —O—, —O—CO—O— —CO— S—, —S—CO—, —CHHalogen-, —CHCN— and/or —CH=CH— and in which one, more than one or all H atoms may be replaced by F, $A^1$ is 1,4-phenylene, trans-1,4-cyclohexylene or a single bond, and $A^2$ is

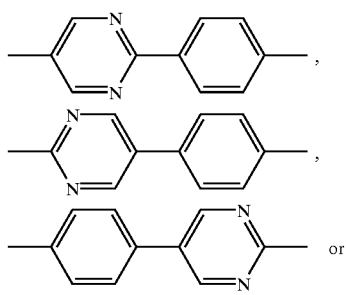

-continued

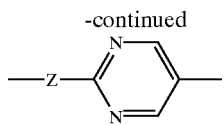

where
Z is —O—CO—, —CO—O—, —S—CO—, —CO—S—, —CH$_2$O—, —OCH$_2$— or —CH$_2$CH$_2$—.

B. Compounds Having Only One Side Chain, of the Formula (III)

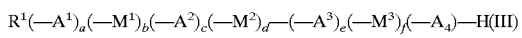

in which $R^1$ is a straight-chain or branched alkyl radical having 1 to 22 or 3 to 22 carbon atoms respectively, in which one or two non-adjacent and non-terminal —CH$_2$— groups may also be replaced by —O—, —CO—, —CO—O—, —O—CO—, —O—CO—O— or —Si(CH$_3$)$_2$—, $A^1$, $A^2$, $A^3$ and $A^4$ are identical or different and are 1,4-phenylene, in which one or two H atoms may be replaced by F or CN, pyridine-2,5-diyl, in which one or two H atoms may be replaced by F, pyrimidine-2,5-diyl, in which one or two H atoms may be replaced by F, trans-1,4-cyclohexylene, 1,3,4-thiadiazole-2,5-diyl or naphthalene-2,6-diyl, $M^1$, $M^2$ and $M^3$ are identical or different and are —CO—O—, —O—CO—, —CH$_2$—O—, —O—CH$_2$— or —CH$_2$—CH$_2$—, a, b, c, d, e and f are zero or one, with the proviso that the sum a+c+e is 0, 1, 2 or 3.

C. Meta-substituted Compounds of the Formula (IV)

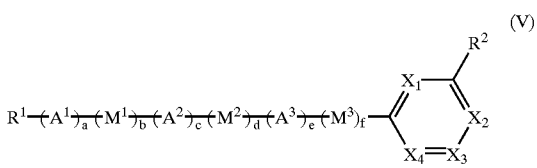

in which $R^1$ and $R^2$ are identical or different and are a straight-chain or branched alkyl radical having 1 to 22 or 3 to 22 carbon atoms respectively, in which, in addition, one or two non-adjacent and non-terminal —CH$_2$— groups may be replaced by —O—, —CO—, —CO—O—, —O—CO—, —O—CO—O— or —Si(CH$_3$)$_2$—, $A^1$, $A^2$ and $A^3$ are identical or different and are 1,4-phenylene, in which one or two H atoms may be replaced by F, pyridine-2,5-diyl, in which one or two H atoms may be replaced by F, pyrimidine-2,5-diyl, in which one or two H atoms may be replaced by F, trans-1,4-cyclohexylene, in which one or two H atoms may be replaced by —CN and/or —CH$_3$, or 1,3,4-thiadiazole-2,5-diyl, and $A^1$ is alternatively

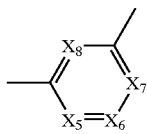

$M^1$, $M^2$ and $M^3$ are identical or different and are
—O—, —CO—O—, —O—CO—, —$CH_2$—O—, —O—$CH_2$— or —$CH_2$—$CH_2$—, $X^1$, $X^2$, $X^3$, $X^4$, $X^5$, $X^6$, $X^7$ and $X^8$ are
CH or N, the number of N atoms per six-membered ring being 0, 1 or 2, a, b, c, d, e and f are zero or one,
with the proviso that the sum a+c+e is 0, 1, 2 or 3.

D. Silicon Compounds of the Formula (V)

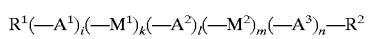 (V)

in which
$R^1$ is a straight-chain or branched alkyl radical having 1 to 22 or 3 to 22 carbon atoms respectively, in which, in addition, one or two non-adjacent and non-terminal —$CH_2$— groups may be replaced by —O—, —CO—, —CO—O—, —O—CO— or —O—CO—O—, $R^2$ is a straight-chain or branched alkyl radical having 1 to 22 or 3 to 22 carbon atoms respectively, in which, in addition, one or two non-adjacent and non-terminal —$CH_2$— groups may be replaced by —O—, —CO—, —CO—O—, —O—CO— or —O—CO—O—, with the proviso that one $CH_2$ group not bonded to oxygen is replaced by —$Si(CH_3)_2$—, $A^1$, $A^2$ and $A^3$ are identical or different and are 1,4-phenylene, in which one or two H atoms may be replaced by F, trans-1,4-cyclohexylene, pyridine-2,5-diyl, in which one or two H atoms may be replaced by F, pyrimidine-2,5-diyl, in which one or two H atoms may be replaced by F, or 1,3,4-thiadiazole-2,5-diyl, $M^1$ and $M^2$ are identical or different and are —CO—O—, —O—CO—, —$CH_2$—O— or —O—$CH_2$—, i, k, l, m and n are zero or 1, with the proviso that i+l+n=2 or 3.

E. Hydroquinone Derivatives of the Formula (VI)

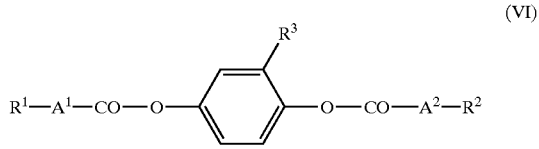 (VI)

in which
$R^1$ and $R^2$ are identical or different and are
a straight-chain or branched alkyl radical having 1 or 3 to 16 carbon atoms respectively, preferably 1 or 3 to 10 carbon atoms respectively, in which, in addition, one or two non-adjacent and non-terminal —$CH_2$— groups may be replaced by —O—, —CO—, —O—CO—, —CO—O— or —O—CO—O—, preferably —O—, —O—CO— or —CO—O—, $R^3$ is —$CH_3$, —$CF_3$ or —$C_2H_5$, preferably —$CH_3$ or —$CF_3$, $A^1$ and $A^2$ are identical or different and are 1,4-phenylene or trans-1,4-cyclohexylene, preferably 1,4-phenylene.

F. Pyridylpyrimidines of the Formula (VII)

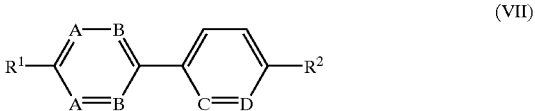 (VII)

in which
A is N and B is CH or A is CH and B is N, C is N and D is CH or C is CH and D is N, where one or two CH groups may be replaced by CF groups, $R^1$ and $R^2$ are identical or different and are
a straight-chain or branched alkyl radical having 1 to 22 or 3 to 22 carbon atoms respectively, in which, in addition, one or two non-adjacent and non-terminal —$CH_2$— groups may be replaced by —O—, —CO—, —CO—O—, —O—CO— or —O—CO—O—.

G. Phenylbenzoates of the Formula (VIII)

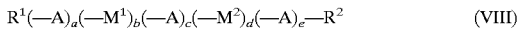 (VIII)

in which
$R^1$ and $R^2$ are identical or different and are
a straight-chain or branched alkyl radical having 1 to 22 or 3 to 22 carbon atoms respectively, in which, in addition, one or two non-adjacent and non-terminal —$CH_2$— groups may be replaced by —O—, —CO—, —CO—O—, —O—CO— or —O—CO—O—, A is 1,4-phenylene,
$M^1$ and $M^2$ are identical or different and are —CO—O— or —O—CO—, a, b, c, d and e are zero or one,
with the proviso that a+c+e=2 or 3 and b+d=1 or 2.

H. Optically Active Phenylbenzoates of the Formula (IX)

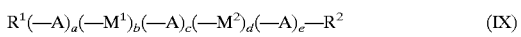 (IX)

in which
$R^1$ and $R^2$ are identical or different and are
a straight-chain or branched alkyl radical having 1 to 22 or 3 to 22 carbon atoms respectively, in which, in addition, one or two non-adjacent and non-terminal —$CH_2$— groups may be replaced by —O—, —CO—, —CO—O—, —O—CO— or —O—CO—O—, and in which at least one of the radicals $R^1$ and $R^2$ is a branched, optically active alkyl group, $M^1$ and $M^2$ are identical or different and are —CO—O—, —O—CO— or a single bond, and a, b, c, d and e are zero or one,
with the proviso that a+c+e=2 or 3 and b+d=1 or 2.

I. Optically Active Oxirane Ethers of the Formula (X)

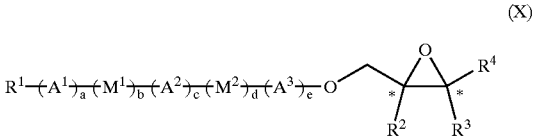 (X)

in which the symbols and indices are defined as follows:
* is a center of chirality,
$R^1$ is a straight-chain or branched alkyl radical having 1 to 22 or 3 to 22 carbon atoms respectively, in which, in addition, one or two non-adjacent and non-terminal —CH$_2$— groups may be replaced by —O —CO—, —CO—O—, —O—CO—, —O—CO—O— or —Si (CH$_3$)$_2$—, or the following optically active group,

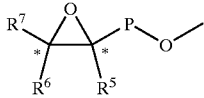

R$^2$, R$^3$, R$^4$, R$^5$, R$^6$ and R$^7$ are identical or different and are hydrogen or a straight-chain or branched alkyl radical having 1 to 16 carbon atoms, P is —CH$_2$— or —CO—, A$^1$, A$^2$ and A$^3$ are identical or different and are
1,4-phenylene, in which one or two H atoms may be replaced by F, pyridine-2,5-diyl, in which one or two H atoms may each be replaced by F, pyrimidine-2, 5-diyl, in which one or two H atoms may be replaced by F, trans-1,4-cyclohexylene, in which one or two H atoms may be replaced by —CN and/or —CH$_3$, or 1,3,4-thiadiazole-2,5-diyl, M$^1$ and M$^2$ are identical or different and are —CO—O—, —O—CO—, —CH$_2$—O—, —O—CH$_2$— or —CH$_2$—CH$_2$—, and a, b, c, d and e are zero or one.

The asymmetrical carbon atoms in the oxirane ring or rings can have identical or different R or S configurations.

J. Optically Active Oxirane Esters of the Formula (XI)

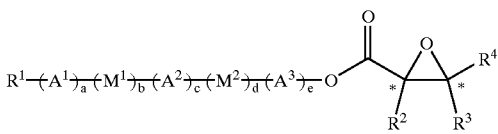

(XI)

in which the symbols and indices are defined as follows:

* is a center of chirality,

R$^1$ is a straight-chain or branched alkyl radical having 1 to 22 or 3 to 22 carbon atoms respectively, in which, in addition, one or two non-adjacent and non-terminal —CH$_2$— groups may be replaced by —O—, —CO—, —CO—O—, —O—CO—, —O—CO—O— or —Si (CH$_3$)$_2$—, R$^2$, R$^3$ and R$^4$ are identical or different and are hydrogen or a straight-chain or branched alkyl radical having 1 to 16 carbon atoms, A$^1$, A$^2$ and A$^3$ are identical or different and are 1,4-phenylene, in which one or two H atoms may be replaced by F, pyridine-2,5-diyl, in which one or two H atoms may each be replaced by F, pyrimidine-2,5-diyl, in which one or two H atoms may be replaced by F, trans-1,4-cyclohexylene, in which one or two H atoms may be replaced by —CN and/or —CH$_3$, or 1,3,4-thiadiazole-2,5-diyl, M$^1$ and M$^2$ are identical or different and are —CO—O—, —O—CO—, —CH$_2$—O—, —O—CH$_2$— or —CH$_2$—CH$_2$—, and a, b, c, d and e are zero or one.

The asymmetrical carbon atoms in the oxirane ring can have identical or different R or S configurations.

K. Optically Active Dioxolane Ethers of the Formula (XII)

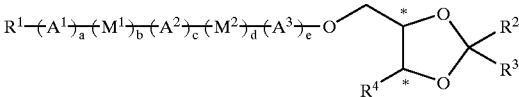

(XII)

in which the symbols and indices are defined as follows:

* is a center of chirality,

R$^1$ is a straight-chain or branched alkyl radical having 1 to 22 or 3 to 22 carbon atoms respectively, in which, in addition, one or two non-adjacent and non-terminal —CH$_2$— groups may be replaced by —O—, —CO—, —CO—O—, —O—CO—, —O—CO—O— or —Si (CH$_3$)$_2$—, R$^2$, R$^3$ and R$^4$ are identical or different and are hydrogen, a straight-chain or branched alkyl radical having 1 to 16 or 3 to 10 carbon atoms respectively or an alkenyl radical having 2 to 16 carbon atoms, where R$^2$ and R$^3$ together may alternatively be —(CH$_2$)$_5$—, A$^1$, A$^2$ and A$^3$ are identical or different and are 1,4-phenylene, in which one or two H atoms may be replaced by F, pyridine-2,5-diyl, in which one or two H atoms may be replaced by F, pyrimidine-2,5-diyl, in which one or two H atoms may be replaced by F, trans-1,4-cyclohexylene, in which one or two H atoms may be replaced by —CN and/or —CH$_3$, or 1,3,4-thiadiazole-2,5-diyl, M$^1$ and M$^2$ are identical or different and are —CO—O—, —O—CO—, —CH$_2$—O—, —O—CH$_2$— or —CH$_2$—CH$_2$—, and a, b, c, d and e are zero or one.

Asymmetrical carbon atoms in the dioxolane ring can have identical or different R or S configurations.

L. Optically Active Dioxolane Esters of the Formula (XIII)

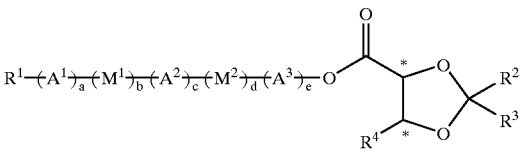

(XIII)

in which the symbols and indices are defined as follows:

* is a center of chirality,

R$^1$ is a straight-chain or branched alkyl radical having 1 to 16 or 3 to 16 carbon atoms respectively, in which, in addition, one or two non-adjacent and non-terminal —CH$_2$— groups may be replaced by —O—, —CO—, —O—CO— or —CO—O—, R$^2$, R$^3$ and R$^4$ are identical or different and are hydrogen or an alkyl or alkenyl radical having 1 to 10 or 2 to 10 carbon atoms respectively, where R$^2$ and R$^3$ together may alternatively be —(CH$_2$)$_5$—, A$^1$, A$^2$ and A$^3$ are identical or different and are 1,4-phenylene, in which one or two H atoms may be replaced by F, pyridine-2,5-diyl, in which one or two H atoms may be replaced by F, pyrimidine-2,5-diyl, in which one or two H atoms may be replaced by F, trans-1,4-cyclohexylene, in which one or two H atoms may be replaced by —CN and/or —CH$_3$, or 1,3,4-thiadiazole-2,5-diyl, $M^1$ and $M^2$ are identical or different and are
—CO—O—, —O—CO—, —CH$_2$—O—,
—O—CH$_2$— or —CH$_2$—CH$_2$—, and a, b, c, d and e are zero or one.

Asymmetrical carbon atoms in the dioxolane ring can have identical or different R or S configurations.

M. Macrocyclic Compounds of the Formula (XIV)

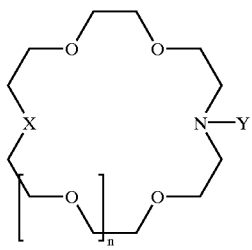

(XIV)

in which

X=—O— or —N(Y)— n is 0 or 1,

Y is —CO-(t-butyl), —CO-(adamantyl) or —CO-alkyl.

N Oligoethers

Oligoethers, such as, for example, Beckopox®, Jeffamin® or polyethylene glycols.

The liquid-crystal components of the formulae (I) to (XIV) are prepared by methods known per se which are familiar to the person skilled in the art, as described, for example, in Houben-Weyl, Methoden der organischen Chemie [Methods of Organic Chemistry], Georg Thieme Verlag, Stuttgart, or the publications cited therein. A particularly preferred area of application of the display according to the invention is chip or smart cards.

The term "chip card" is taken to mean a card, usually made of plastic and in conventional credit card format, provided with an integrated circuit which can electronically store information, and means for information transfer between the card and an electronic read/write system.

A smart card is a chip card which contains means for checking/controlling access to the card. For example, these means can be an integrated circuit which controls who uses the stored information and for what purpose, enabling data security to be increased.

Chip cards and smart cards are already in widespread use, for example as telephone cards, credit cards, 'medicards', cash cards, and as identity cards for access control.

In the near future, it is expected that this technology will penetrate further into areas such as the 'electronic wallet', i.e. replacement of cash, travel tickets and pay TV.

In this application, the FLC display according to the invention contains outer plates, which, for flexibility, preferably consist of plastic. Examples of suitable plastics are known plastics, such as polyarylates, polyether sulfone, cycloolefin copolymers, polyether imides, polycarbonate, polystyrene, polyester, polymethyl methacrylates, and copolymers and blends thereof.

In order to produce a chip card, the FLC display is embedded in or applied to a plastic card provided with one or more electronic microchips.

The microchips contain the program and/or storage functions which guarantee the desired function of the chip card. Such chips and their production are extremely well known to the person skilled in the art.

The chip card preferably has a format as defined in ISO 7816 and the following.

The card generally consists of plastic, preferably of polyvinyl chloride (PVC), acrylate-butadiene-styrene (ABS) or copolymers.

In addition, they contain means for data exchange with an external read/write system, for example electroconductive contacts or an "antenna" in the form of a flat coil.

The plastic cards used are known, and the majority are commercially available (for example Gemplus, http://www.gemplus.fr).

The chip card according to the invention is suitable, for example, as a check card, electronic travel ticket, telephone card, car park card, 'electronic wallet' or for pay TV.

The references cited in this application are expressly incorporated herein by way of reference.

The invention is explained in greater detail by the examples.

EXAMPLE 1

A glass plate coated with indium-tin oxide is structured in a photolithographic process in such a way that an electrode pattern is obtained. The transparent conductor tracks of this electrode structure are used for electrical addressing of the display. For alignment of the liquid crystal, an organic alignment layer is applied and rubbed. Two glass plates structured in this way, forming the top and bottom of the display, are joined with the aid of an adhesive frame and filled with the mixture indicated below.

The adhesive is hardened, and the cell is sealed, aligned by slow cooling to the operating temperature and joined between a pair of polarizing films to give a finished display. The display electrode contacts, which are routed to the outside, are connected to the addressing electronics. The FLC mixture consisting of the achiral base mixture A

| Structure | % |
|---|---|
| $C_8H_{17}$—[pyrimidine]—[phenyl]—O—$C_8H_{17}$ | 6% |
| $C_8H_{17}$—O—[pyrimidine]—[phenyl]—O—$C_8H_{17}$ | 2% |
| $C_8H_{17}$—[pyrimidine]—[phenyl]—O—$C_{10}H_{21}$ | 5% |
| $C_8H_{17}$—O—[pyrimidine]—[phenyl]—O—$C_6H_{13}$ | 4% |
| $C_8H_{17}$—O—[pyrimidine]—[phenyl]—O—$C_4H_9$ | 4% |
| $C_8H_{17}$—O—[phenyl]—CO—O—[phenyl]—O—$C_6H_{13}$ | 6% |
| $C_8H_{17}$—O—[phenyl]—[phenyl]—O—$C_{10}H_{21}$ | 4% |
| $C_8H_{17}$—[pyridine]—[phenyl]—O—$C_6H_{13}$ | 7% |

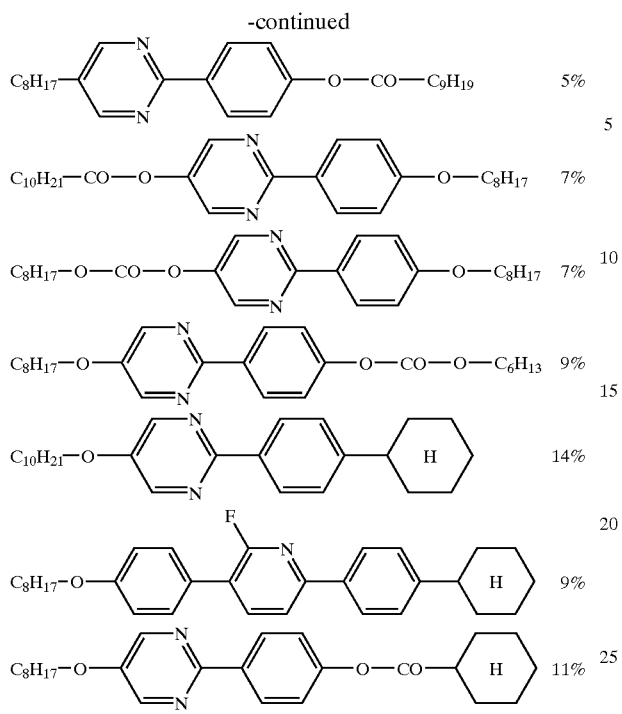

and the dopants

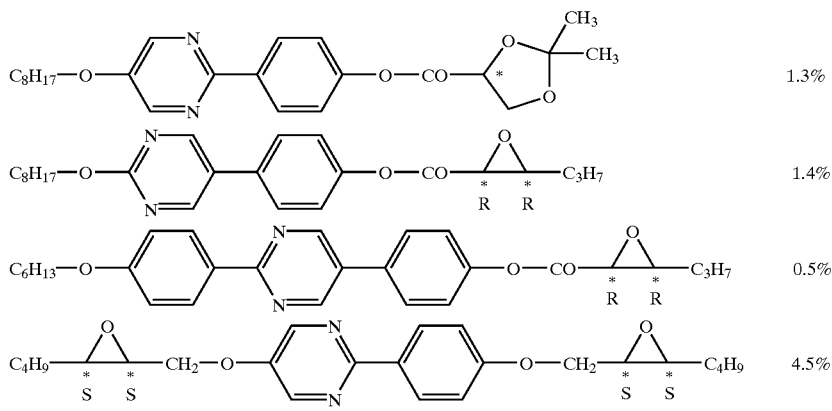

has a spontaneous polarization of 9.5 nCcm$^{-2}$ at 25° C. The S$_C$* phase to range which can be utilized for the display covers the temperatures from −26° C. to 70° C. The display has a thickness of 2 μm and can be operated at a constant voltage of 8 V. For this operating voltage, the temperature range for a response time (operating pulse width t) of 3 ms is from 60° C. to 10° C., and the quotient of the threshold voltages at 0° C. and 40° C. Q=4.5. For a response time of t=30 milliseconds, Q=3.9, while, for t=100 ms, Q=3.5.

EXAMPLE 2

A flexible plastic film (obtainable, for example, from Sumitomo Bakelite, product code FST 5352, thickness 100 μm, 200 Ω/coated with indium-tin oxide) is structured in a photolithographic process to give an electrode pattern. The transparent conductor tracks of this electrode structure are used for electrical addressing of the display. The substrates are coated with an alignment layer, which is rubbed with a roll. Two structured films forming the top and bottom of the display are joined with the aid of an adhesive frame and filled with the mixture indicated below.

The adhesive is hardened, and the cell is sealed, aligned by slow cooling to the operating temperature and installed in a smart card between a pair of polarizing films. The switching-cell electrode contacts, which are routed to the outside, are connected to the corresponding contacts or flat coils of the smart card.

The FLC mixture consisting of the achiral base mixture A (see Example 1) and the dopants

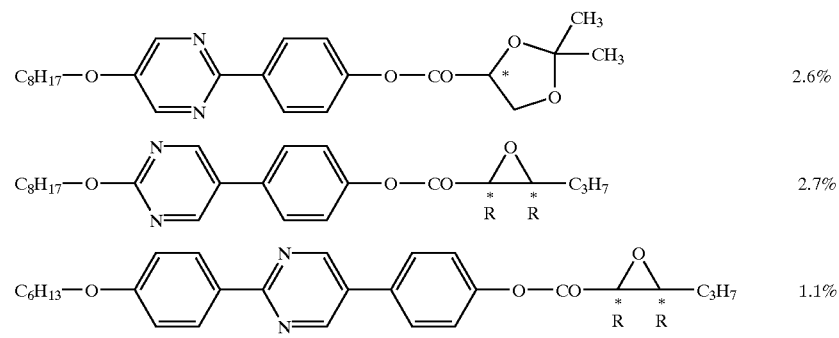

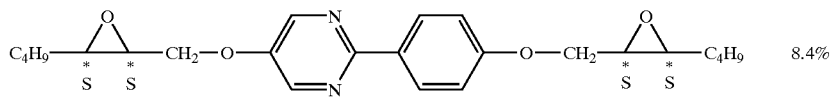 8.4% has a spontaneous polarization of 47 nCcm$^{-2}$ at 25° C. The $S_C^*$ phase range which can be utilized for the smart card covers the temperatures from −28° C. to 73° C. The display has a thickness of 2 tm and can be operated at a constant voltage of 2 V. The temperature range for this operating voltage, for a response time (operating pulse width t) of 3 ms, is from 60° C. to −5° C., and the quotient of the threshold voltages at 0° C. and 40° C. Q=2.7. For a response-time of t=1 ms, the temperature range is from 10° C. to 60° C., and Q=4.3.

The following were determined as further values of Q:

|  |  |
|---|---|
| Q = 2.4 | for t = 10 ms |
| Q = 1.9 | for t = 30 ms |
| Q = 1.8 | for t = 100 ms |

EXAMPLE 3

A flexible plastic film (obtainable, for example, from Sumitomo Bakelite, product code FST 5352, thickness 100 μm, 200 Ω/coated with indium-tin oxide) is structured in a photolithographic process to give an electrode pattern. The transparent conductor tracks of this electrode structure are used for electrical addressing of the display. The substrates are coated with an alignment layer, which is rubbed with a roll. Two structured films forming the top and bottom of the display are joined with the aid of an adhesive frame and filled with the mixture indicated below.

The adhesive is hardened, and the cell is sealed, aligned by slow cooling to the operating temperature and installed in a smart card between a pair of polarizing films. The switching-cell electrode contacts, which are routed to the outside, are connected to the corresponding contacts or flat coils of the smart card.

The FLC mixture consisting of

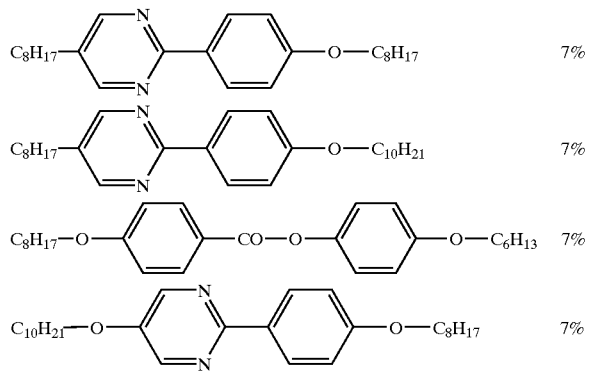

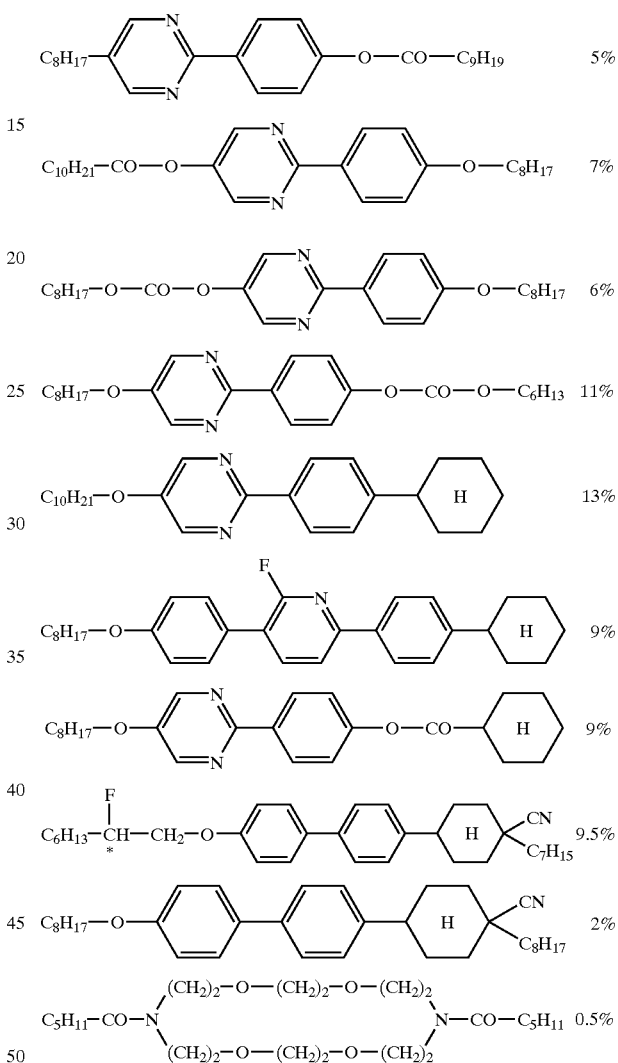

has a spontaneous polarization of 23 nCcm$^{-2}$ at 25° C. The $S_C^*$ phase range which can be utilized for the smart card covers the temperatures from −26° C. to 77° C. The display has a thickness of 2 μm and can be operated at a constant voltage of 5 V. The temperature range for this operating voltage, for a response time (operating pulse width 10 ms, is from 60° C. to −10° C., and the quotient of the threshold voltages at 0° C. and 40° C. Q=2.5. For a response time of 3 milliseconds, the temperature range is from 60° C. to 0° C. and Q=2.3. For a response time of 1 millisecond the temperature range is from 60° C. to 10° C. and Q=3.5. For a response time of t=100 ms, Q=2.1.

TABLE 1

Table 1 shows Q (the quotient of the electrical field strength at 0° C. and 40° C.) as a function of $P_s$ and the response time.

| $P_S$ (25° C.) ($nCcm^{-2}$) | Response time 1 ms | Response time 3 ms | Response time 10 ms | Response time 30 ms | Response time 100 ms | Example No. |
|---|---|---|---|---|---|---|
| 9.5 | | 4.5 | | 3.9 | 3.5 | 1 |
| 23 | 3.5 | 2.3 | 2.5 | | 2.1 | 3 |
| 47 | 4.3 | 2.7 | 2.4 | 1.9 | 1.8 | 2 |

TABLE 2

Table 2 shows the temperature range which can be addressed at constant voltage.

| Example No. | Response time 1 ms | Response time 3 ms | Response time 10 ms | Operating voltage (V) |
|---|---|---|---|---|
| 1 | | +10° C. – +60° C. | | 8 |
| 2 | +10° C. – +60° C. | –5° C. – +60° C. | | 2 |
| 3 | +10° C. – +60° C. | 0° C. – +60° C. | +10° C. – +60° C. | 5 |

Counterexample:

The display from Example 1, filled with a mixture having $P_s$=9.5 ($nCcm^{-2}$), is addressed with a response time of t=1 ms. The product of the spontaneous polarization (in $nCcm^{-2}$) and the response time (in ms) is $P_s \times t$=9.5. The temperature range which can be addressed at a constant 8 V is only from 60° C. to 25° C.

What is claimed is:

1. A process for operating a FLC display containing a ferroelectric liquid crystal mixture, wherein the display is addressed with voltage pulses of an operating pulse width of longer than 10 milliseconds and wherein the spontaneous polarization at 25° C. is at least 20 nC $cm^{-2}$ in order to decrease the temperature dependence of the threshold voltage of the display.

2. A process as claimed in claim 1, wherein the liquid crystal mixture contains at least two components of the formula (I).

3. A process as claimed in claim 1, wherein the product of the spontaneous polarization (nC $cm^{-2}$) of the liquid crystal mixture at 25° C. and the operating pulse width (ms) is greater than 500.

4. A process as claimed in claim 1, wherein the spontaneous polarization at 25° C. is at least 20 nC $cm^{-2}$ and the operating pulse width is greater than 2.5 ms.

5. A process as claimed in claim 1, wherein the voltage pulses have less than 5 V.

6. A process as claimed in claim 5, wherein the voltage pulses have less than 3 V.

7. A process as claimed in claim 1, wherein the liquid crystal mixture has a phase sequence isotropic-nematic-smectic A-smectic C and a smectic A-smectic C phase transition temperature of at least 70° C.

8. A process as claimed in claim 1, wherein the FLC display is in a chip card.

9. A process for improving the temperature dependence of the operating voltage of an FLC display, wherein the display is addressed with voltage pulses which are longer than 10 ms and wherein the spontaneous polarization at 25° C. is at least 20 nC $cm^{-2}$.

* * * * *